United States Patent
Knoedgen

(10) Patent No.: US 9,270,183 B2
(45) Date of Patent: Feb. 23, 2016

(54) CONVERTER ONE PIN SENSING

(71) Applicant: Dialog Semiconductor GmbH, Kirchheim/Teck-Nabern (DE)

(72) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 266 days.

(21) Appl. No.: 13/951,742

(22) Filed: Jul. 26, 2013

(65) Prior Publication Data

US 2014/0210377 A1 Jul. 31, 2014

(30) Foreign Application Priority Data

Jan. 28, 2013 (EP) .................................... 13152899

(51) Int. Cl.
| | |
|---|---|
| H05B 37/02 | (2006.01) |
| H05B 39/02 | (2006.01) |
| H02M 3/335 | (2006.01) |
| H02M 1/42 | (2007.01) |
| H05B 33/08 | (2006.01) |

(52) U.S. Cl.
CPC ........ H02M 3/33507 (2013.01); H02M 1/4208 (2013.01); H05B 33/0815 (2013.01); Y02B 20/346 (2013.01); Y02B 70/126 (2013.01)

(58) Field of Classification Search
CPC ........... H02M 3/33507; H02M 1/4208; H05B 33/0815
USPC .............. 315/209 R, 246–247, 254; 363/89
See application file for complete search history.

(56) References Cited

U.S. PATENT DOCUMENTS

| | | | | |
|---|---|---|---|---|
| 5,461,303 | A * | 10/1995 | Leman et al. | 323/222 |
| 6,646,897 | B1 * | 11/2003 | Lomax et al. | 363/97 |
| 6,856,519 | B2 * | 2/2005 | Lin et al. | 363/16 |
| 6,956,750 | B1 | 10/2005 | Eason et al. | |
| 7,457,138 | B2 * | 11/2008 | Sheng et al. | 363/21.12 |
| 8,704,590 | B2 * | 4/2014 | Lai et al. | 327/540 |

(Continued)

FOREIGN PATENT DOCUMENTS

| | | |
|---|---|---|
| DE | 102006018577 | 10/2007 |
| DE | 102009047984 | 4/2011 |
| TW | 200607216 | 2/2006 |

(Continued)

OTHER PUBLICATIONS

European Search Report, 13152899.4-1804, Mailed: Jul. 18, 2013, Dialog Semiconductor GmbH.

*Primary Examiner* — Kenneth B Wells
(74) *Attorney, Agent, or Firm* — Saile Ackerman LLC; Stephen B. Ackerman

(57) ABSTRACT

Power converters, such as switched-mode power converters comprise a reduced number of sensing pins. A power converter is configured to convert electrical energy at an input voltage into electrical energy at an output voltage. The power converter comprises a power switch configured to be switched between on- and off-states; and a controller configured to generate a control signal for putting the power switch into the on-state and off-state, respectively; wherein the control signal is generated based on a first and second measurement signal from the power converter external to the controller. The controller comprises a sensing pin configured to sense the first measurement signal, when the power switch is in on-state, and configured to sense the second measurement signal, when the power switch is in off-state.

24 Claims, 7 Drawing Sheets

(56) References Cited

U.S. PATENT DOCUMENTS 8,817,496 B2 * 8/2014 Keogh et al. ............... 363/21.16
2010/0066337 A1 3/2010 Gong et al.

FOREIGN PATENT DOCUMENTS

| WO | WO 2007 121944 | 11/2007 |
| WO | WO 2011/039313 | 4/2011 |

* cited by examiner

CONVERTER ONE PIN SENSING

TECHNICAL FIELD

The present document relates to power converters, such as switched-mode power converters. In particular, the present document relates to power converters comprising a reduced number of sensing pins.

BACKGROUND

Switched-mode power converters typically comprise a power converter network comprising one or more power switches and a controller configured to control the one or more power switches. In particular, the controller may be configured to control the time instances at which the one or more power switches are put into an on-state and into an off-state. The controller may comprise one or more sensing pins configured to receive various measurement signals from the power converter network. The controller may use the measurement signals to control the one or more power switches. In typical implementations of power converters, several different sensing pins are used for several different measurement signals. By way of example, a typical approach is to use several different pins for current sensing and voltage measurements, respectively.

Power converters, e.g. power converters which are used in retrofit lamp driver circuits, are strongly constrained in cost, size and component count. As a consequence, integrated circuits (ICs) used in such power converters (e.g. as controllers) should be designed with a minimum number of pins. Minimizing the pin count typically reduces the number of external components, the losses in sensor elements (voltage dividers, shunts) and the chip area required for additional pads and analog sensing blocks. Hence, the pin count is an important cost driver for low cost power converters.

In the present document, power converters are described which allow the sensing of multiple measurement signals using a single sensing pin. By way of example, a flyback power converter with one pin sensing (for system detection, current measurement, bus voltage measurement and/or avalanche measurement) is described. Furthermore, a power factor correction (PFC) with a multi-function pin for simultaneous detection of the input voltage, the bus voltage and/or for zero-crossing timing measurement is described.

SUMMARY

According to an aspect of the invention, a power converter configured to convert electrical energy at an input voltage into electrical energy at an output voltage is described. The power converter may comprise a switched-mode power converter, such as a SEPIC, a flyback converter, a buck converter, a boost converter, and/or a buck-boost converter. The input voltage may correspond to the voltage at an input of the power converter (e.g. upstream of a power switch of the power converter) and the output voltage may correspond to the voltage at an output of the power converter (e.g. downstream of the power switch of the power converter). The power converter may comprise one or more converter stages, wherein each converter stage may comprise a switched-mode power converter.

The power converter may comprise a power switch configured to be switched between an on-state and an off-state. The power switch may comprise or may be implemented as a transistor, e.g. a metal-oxide semiconductor field effect transistor. The power switch may be controlled using a control signal generated by a controller. The control signal may comprise a pulse width modulated signal, thereby putting the power switch in the on-state and the off-state in a commutated manner.

The power converter may comprise the controller configured to generate the control signal for putting the power switch into the on-state and into the off-state, respectively. Typically, the control signal is applied to a gate of the power switch. The controller may be configured to generate the control signal based on a first measurement signal and/or based on a second measurement signal. The first and/or second measurement signals may be measurement signals from the power converter. In particular, a measurement signal may be determined at a node within the power converter, wherein the node is external to the controller. The measurement signal may be indicative of a voltage or a current at the corresponding node within the power converter. Examples for the first measurement signal are e.g. the input voltage of the power converter and/or a current through the power switch. Examples for the second measurement signal are the input voltage of the power converter and/or the voltage drop at a transformer or a winding/coil of the power converter. The first and second measurement signals are typically different from one another. In particular, the first and second measurement signals are typically determined at different nodes within the power converter.

The controller, which may be implemented e.g. as an integrated circuit comprising a plurality of pins, may comprise one or more sensing pins. In particular, the controller may comprise a sensing pin configured to sense the first measurement signal, when the power switch is in on-state, and configured to sense the second measurement signal, when the power switch is in off-state. As such, the controller may be provided with a plurality of different measurement signals using only a single sensing pin, thereby reducing the cost of the power converter.

The power converter may comprise a voltage divider coupled to the input voltage of the power converter. By way of example, the input voltage of the power converter may correspond to (a rectified version of) the mains voltage. The voltage divider may comprise a high side resistor coupled to the input voltage and/or a low side resistor coupled to ground (or some other pre-determined potential). The high side resistor and/or a midpoint between the high side resistor and the low side resistor may be coupled to the sensing pin, thereby providing the first measurement signal. In this case, the first measurement signal may be indicative of the input voltage. The low side resistor may be implemented within the controller.

Alternatively, the voltage divider may be formed using a current mirror which is internal to the controller. In particular, the voltage divider may comprise a current mirror arranged in series with a second current source. The current mirror and the second current source may be internal to the controller. A first side of the current mirror may be coupled to the sensing pin and a second side of the current mirror may be coupled to the second current source. The controller may comprise a second comparator configured to measure the first measurement signal at the second side of the current mirror. The controller may comprise an additional switch arranged between the sensing pin and the first side of the current mirror and configured to decouple the current mirror from the sensing pin, when sensing the second measurement signal. The use of a current mirror may be beneficial in order to lower the level of the first measurement signal. This may be achieved e.g. by using a current mirror comprising MOS transistors with a MOS diode.

As such, the first measurement signal may be used by the controller to determine one or more events which are encoded into the input voltage. By way of example, the controller may be configured to operate the power converter according to a current operation state. Furthermore, the controller may be configured to detect one of a plurality of pre-determined events based on the first measurement signal (e.g. based on the indication of the input voltage). In addition, the controller may be configured to determine a target operation state in accordance with a pre-determined state machine, based on the current operation state and based on the detected one of the plurality of pre-determined events. The power converter may then be operated in accordance with the target operation state. By way of example, the power converter may be used in a driver circuit for a light bulb assembly. As such, the operation states of the power converter may correspond to different illumination states of the light bulb assembly:

The power converter may comprise a transformer comprising a primary winding and an auxiliary winding. The primary winding and the auxiliary winding may be electromagnetically coupled. An example of a power converter which comprises a transformer is a power converter having a SEPIC architecture. The primary winding of the transformer may be arranged in series with the power switch. In particular, the primary winding may be arranged such that the primary winding may be coupled to ground via the power switch, when the power switch is in on-state. The auxiliary winding may be coupled to the sensing pin, thereby providing the second measurement signal. In such a case, the second measurement signal may be indicative of the voltage drop across the transformer, i.e. the voltage drop across the auxiliary winding which typically corresponds to the voltage drop across the primary winding. The voltage drop across the transformer may be used to detect free-wheeling of the transformer (i.e. to detect the time instant, when the current through the primary winding drops to substantially zero).

As such, a single sensing pin of the controller may be used to provide the controller with information regarding the input voltage (e.g. for controlling the operational state of the power converter) and with information regarding free-wheeling of the transformer of the power converter (e.g. for determining the time instant for putting the power switch to on-state).

The auxiliary winding may be coupled to the sensing pin via a diode. The diode may be reverse biased, when the power switch is in on-state, thereby decoupling the auxiliary winding from the sensing pin, when the power switch is in on-state. By doing this, it is ensured that the provision of the first measurement signal is not disturbed by the second measurement signal (provided via the auxiliary winding).

The controller may comprise a current source which is coupled to the sensing pin of the controller via a control switch. The current source may be coupled to ground (or to another pre-determined potential). The controller may be configured to open the control switch, when the power switch is put to on-state. Furthermore, the controller may be configured to close the control switch, when the power switch is put to off-state. The control switch and the current source may be arranged in parallel to the low side resistor of the voltage divider. Furthermore, the control switch and the current source may exhibit low impedance compared to the low side resistor. As such, it is ensured that the provision of the second measurement signal to the controller is not disturbed by the first measurement signal (provided by the voltage divider).

The controller may comprise a comparator (which may be based on an operational amplifier) configured to measure a voltage at the sensing pin. In particular, the comparator may be configured to compare the voltage at the sensing pin to a reference voltage, thereby indicating whether the voltage at the sensing pin is greater or smaller than the reference voltage. As such, the controller may be configured to determine whether the first measurement signal is greater or smaller than a reference voltage (when the power switch is in on-state) and whether the second measurement signal is greater or smaller than a (possibly different) reference voltage (when the power switch is in off-state).

As indicated above, the power converter may comprise a transformer. The transformer may comprise a primary winding and a secondary winding. This may be the case, e.g. for a flyback power converter. The power converter may comprise a voltage divider coupled to the input voltage via the primary winding of the transformer. The voltage divider is typically different from the voltage divider described above. In particular, the voltage divider may be arranged in parallel to the power switch. The voltage divider may comprise a high side resistor coupled to the input voltage via the primary winding of the transformer and a low side resistor coupled to ground (or another pre-determined potential). The low side resistor may be coupled to ground (or to another pre-determined potential) via a shunt resistor. A midpoint between the high side resistor and the low side resistor may be coupled to the sensing pin, thereby providing the second measurement signal. The second measurement signal may be indicative of the input voltage. Furthermore, the second measurement signal may be indicative of a voltage drop across the primary winding of the transformer.

As such, a discontinuity of the second measurement signal may be indicative of a free-wheeling of the primary winding of the transformer, thereby indicating the time instant when the current through the primary winding of the transformer reaches substantially zero.

The power converter may comprise a shunt resistor, wherein the shunt resistor may be arranged in series with the voltage divider and in series with the power switch. The shunt resistor may be coupled to the midpoint of the voltage divider via the low side resistor, thereby providing the first measurement signal to the sensing pin of the controller. As such, the controller may be provided with information regarding the current through the power switch.

Overall, the controller may be provided with a second measurement signal, which is indicative of the input voltage and the free-wheeling of the primary winding of the transformer, and with a first measurement signal, which is indicative of the current through the power switch, using only a single sensing pin, thereby reducing the cost of the power converter.

The power converter may comprise a supply voltage capacitor coupled to a supply voltage pin of the controller. The controller may be configured to couple the sensing pin to the supply voltage pin, upon startup of the power converter to charge the supply voltage capacitor via the high side resistor of the voltage divider. In particular, the controller may comprise a startup diode which is configured to let pass a current from the sensing pin to the supply voltage pin, and which is configured to block a current from the supply voltage pin to the sensing pin and/or to measurement circuitry used to measure the first and/or second measurement signals. As such, the startup diode may be configured to allow for a charging of the supply voltage capacitor using the high side resistor of the voltage divider. On the other hand, the startup diode may be configured to decouple the supply voltage capacitor (i.e. the supply voltage pin) from the measurement circuitry used to measure the first and/or second measurement signals.

It should be noted that the low side resistor of the voltage divider may be internal to the controller. The low side resistor may be part of the measurement circuitry. As such, the power converter may comprise a high side resistor which is external to the controller and which may be used to provide a startup current to the supply voltage capacitor. Furthermore, the power converter may comprise a low side resistor which is internal to the controller and which forms a voltage divider with the external high side resistor, when the startup switch is closed.

The controller may further comprise a startup switch configured to decouple the measurement circuitry for measuring the first and second measurement signals, when the startup switch is open. On the other hand, the startup switch may be configured to couple the sensing pin with the measurement circuitry, when the startup switch is closed. The startup switch may be arranged in series with the supply voltage pin and the startup diode on one side of the startup switch and with the measurement circuitry on the other side of the switch. As such, the startup switch may be used to avoid an impact of the measurement circuitry on the charging of the supply voltage capacitor. The measurement circuitry may comprise the current source, the control switch and/or the comparator used to determine the first and/or second measurement signals.

According to a further aspect, a driver circuit, e.g. a driver circuit for a light source such as a solid state light (SSL) source, is described. The driver circuit may comprise the power converter described in the present document.

According to another aspect, a light bulb assembly is described. The light bulb assembly comprises an electrical connection module configured to electrically connect to a mains power supply, thereby providing electrical energy at the input voltage. Furthermore, the light bulb assembly comprises a power converter as described in the present document. The power converter may be configured to provide electrical energy at an output voltage from the electrical energy at the input voltage. In addition, the light bulb assembly comprises a light source (e.g. an SSL source such as an LED array or an OLED array) configured to provide light using the electrical energy at the output voltage.

According to another aspect, a method for converting electrical energy at an input voltage into electrical energy at an output voltage is described. The method comprises switching a power switch of a power converter between an on-state and an off-state, subject to a control signal. Furthermore, the method comprises providing a first measurement signal from the power converter to a controller via a sensing pin of the controller, when the power switch is in on-state. The first measurement signal may be provided using a voltage divider coupled to the input voltage. In addition, the method comprises providing a second measurement signal from the power converter to the controller via the same sensing pin of the controller, when the power switch is in off-state. The second measurement signal may be provided using a transformer comprising a primary winding arranged in series with the power switch. The control signal for putting the power switch into the on-state and into the off-state, respectively, may be generated by the controller based on the first and/or the second measurement signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

SHORT DESCRIPTION OF THE FIGURES

The invention is explained below in an exemplary manner with reference to the accompanying drawings, wherein FIG. 1 illustrates a block diagram of an example light bulb assembly;

DETAILED DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz (mains frequency) and in North America at 110-120 VAC at 60 Hz (mains frequency). The principles set out in the present document apply to any suitable electricity supply, including the mains/power line mentioned, and a DC power supply, and a rectified AC power supply.

Figure 1:
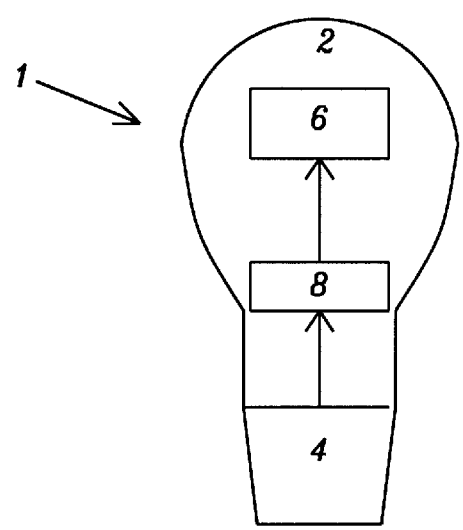

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples of an electrical connection module 4 are the E11, E14 and E27 screw types of Europe and the E12, E17 and E26 screw types of North America. Furthermore, a light source 6 (also referred to as an illuminant) is provided within the housing 2. Examples of such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting diode, or by a plurality of LEDs:

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

The driver circuit 8 of a light bulb assembly 1 should be configured to provide a drive current to the light source 6 almost instantaneously, subsequent to turning on of the mains supply (e.g. subsequent to a user switching on the light). Consequently, the driver circuit 8 should exhibit a low startup time. On the other hand, the driver circuit 8 should be configured to measure the mains supply which may be used to encode events which may be used to control the behaviour of the light bulb assembly 1. By way of example, intentional interruptions of the mains supply may enable a user to control the dimming of the light bulb assembly 1 using an on/off light switch. The driver circuit 8 should be configured to determine such interruptions.

Figure 2A:
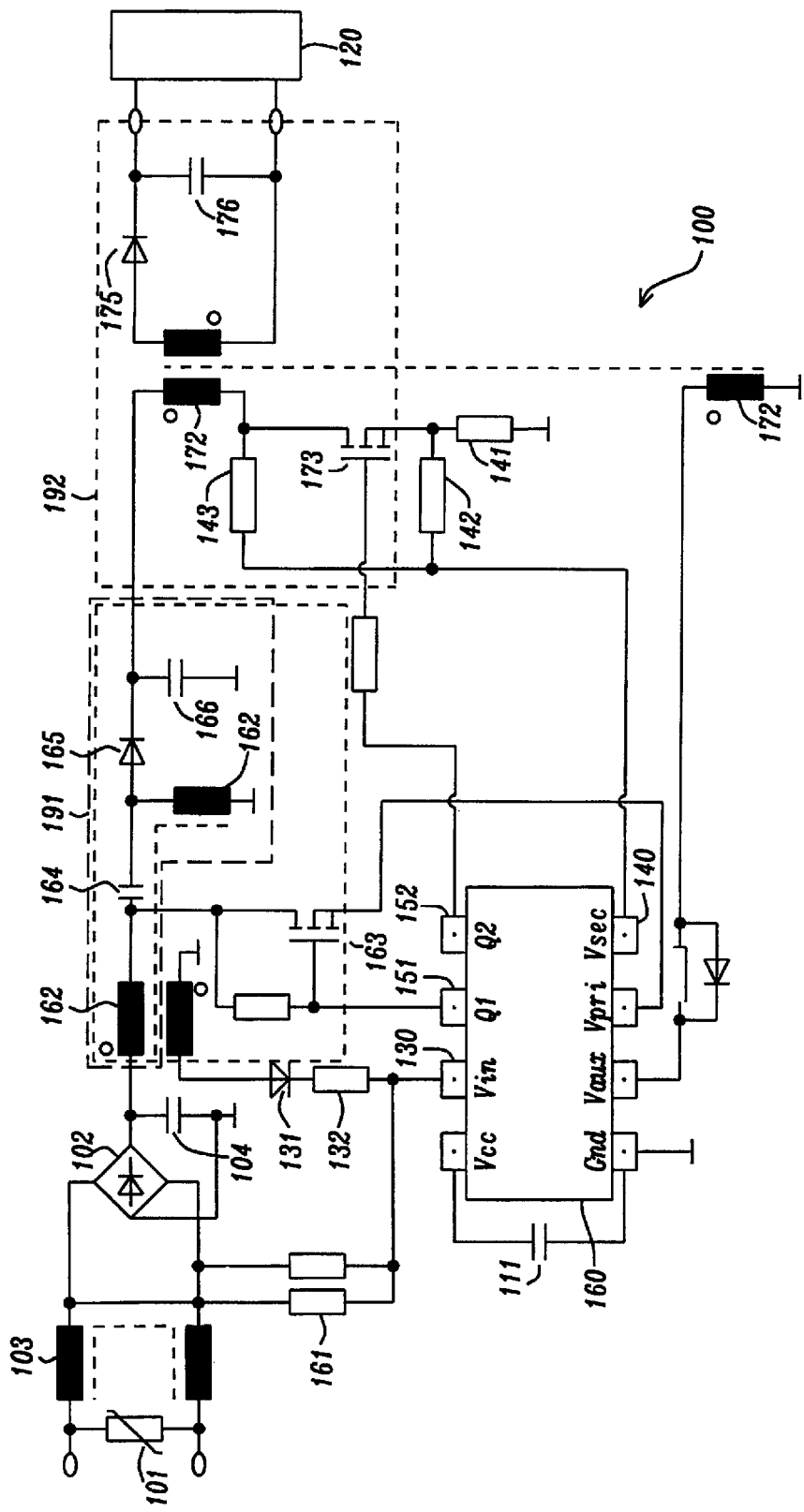
FIG. 2a shows a circuit diagram of an example switched-mode power converter.

FIG. 2a illustrates an example circuit diagram of a driver circuit 8, 100 for an LED (light emitting diode) array 6, 120. The driver circuit 100 may be used in a retrofit light bulb assembly 1 as described in FIG. 1. The driver circuit 100 comprises a rectifier 102 in combination with EMI (electromagnetic interference) filter components 103, 104, which are configured to provide a DC input voltage from a mains supply 101. Furthermore, the driver circuit 100 comprises a controller 160 which may be implemented as an integrated circuit (IC). The supply voltage for the controller 160 may be maintained using a supply voltage capacitor 111. The controller 160 comprises a startup and input voltage sensing pin 130, which is coupled to the (non-rectified) input voltage using the startup resistors 161. The particular arrangement of the startup resistors 161 ensures that the voltage at the startup and input voltage sensing pin 130 is always positive. This is illustrated in FIG. 2c, where it can be seen that the startup resistors 161 are arranged in combination with the full-wave rectifier 102, such that the voltage at the startup and input voltage sensing pin 130 is always positive.

Figure 2B:
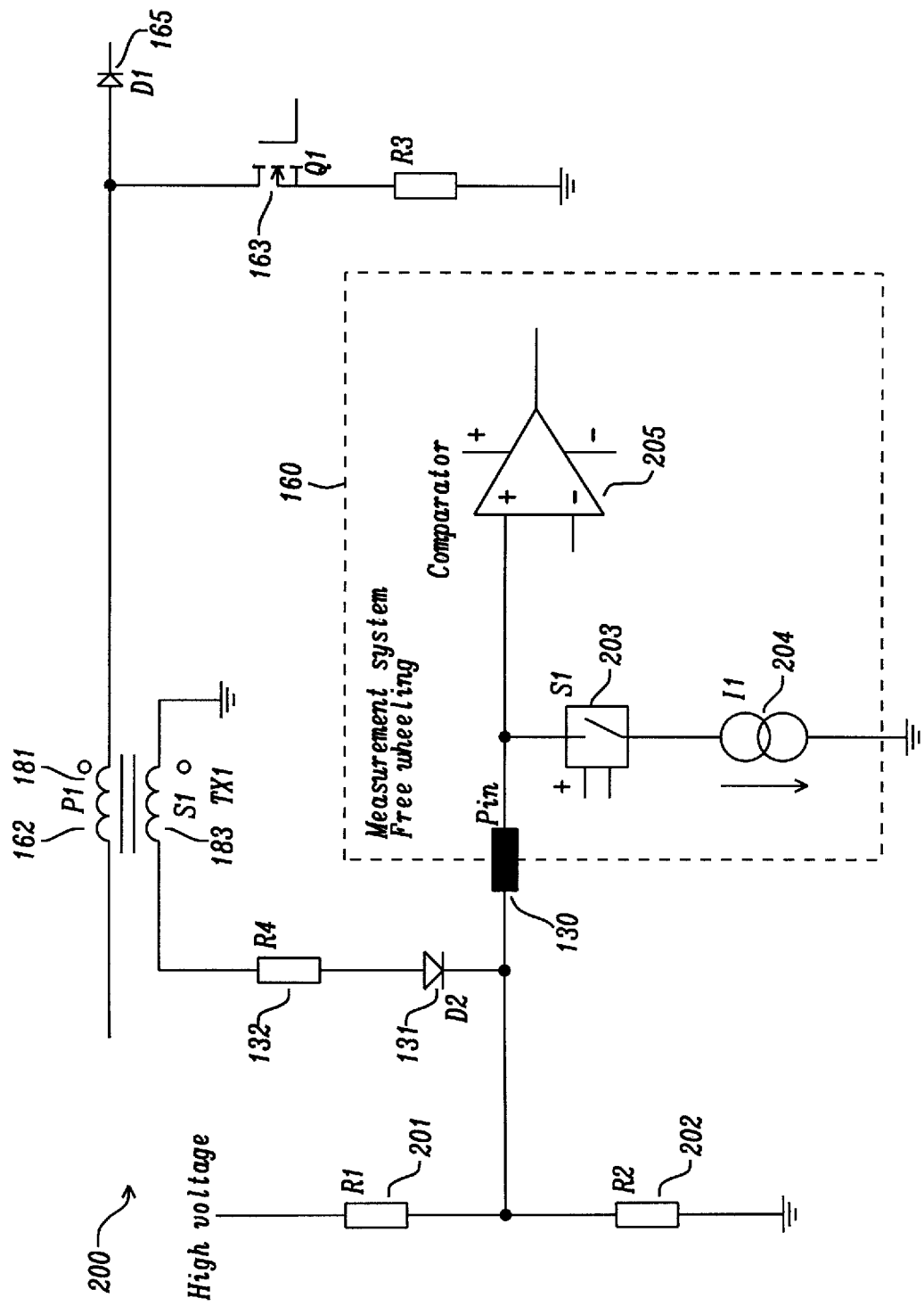
FIG. 2b shows an excerpt of an example power converter using a single sensing pin for measuring the input voltage and for measuring free-wheeling.
Figure 2C:
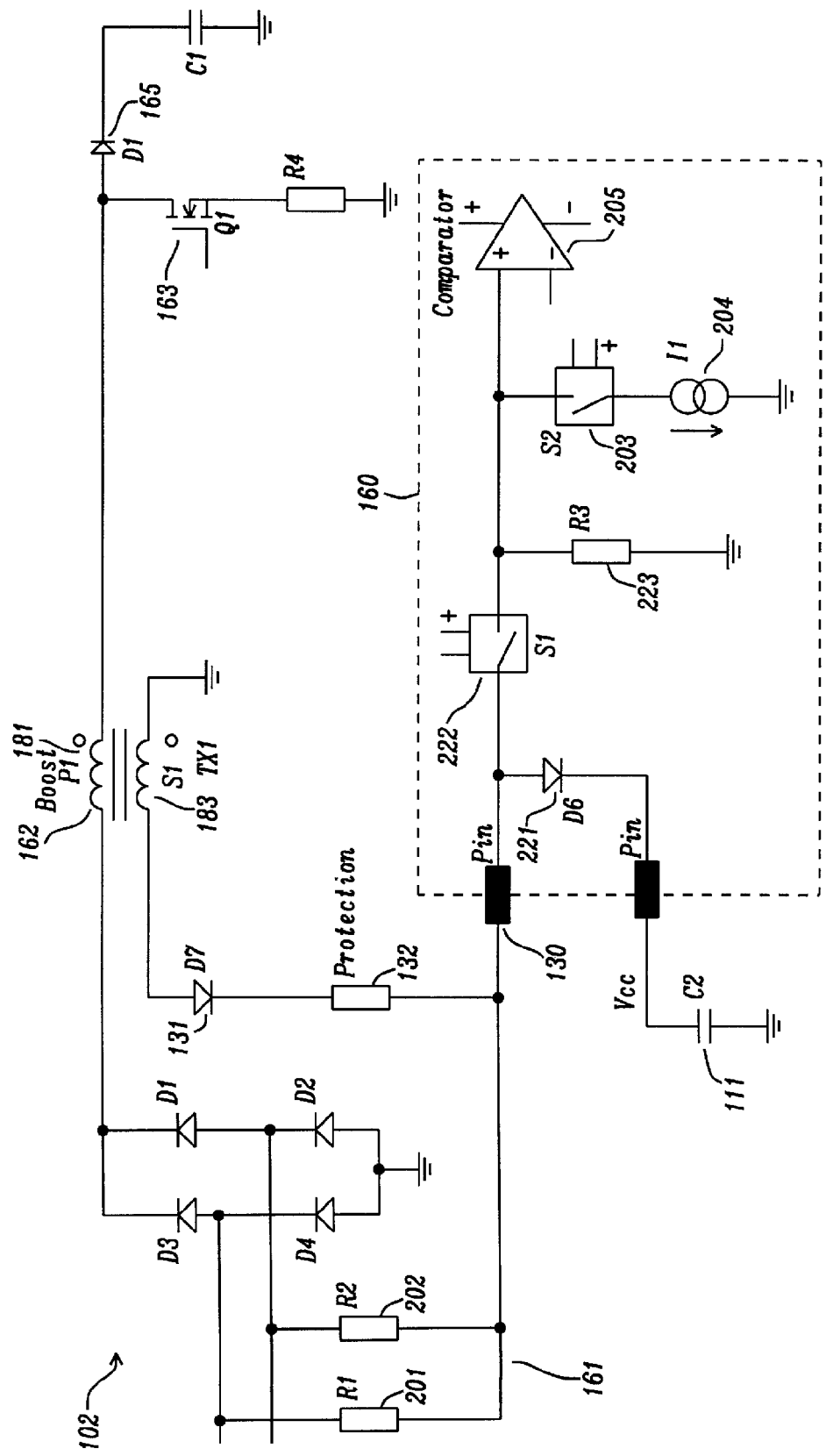
FIG. 2c shows an excerpt of another example power converter using a single sensing pin for charging the supply voltage capacitor, for measuring the input voltage and for measuring free-wheeling.

Furthermore, FIG. 2c shows that the startup resistors 161 may be coupled to the supply voltage capacitor 111 via a diode function 221 which may be internal to the controller 160. For startup, the switch 222 may be opened, thereby coupling the input voltage via the startup resistors 161 to the supply voltage capacitor 111. When closing the switch 222, the voltage drop will be significantly lower than the supply voltage Vcc, such that the diode function 222 is reverse-biased, thereby decoupling the supply voltage capacitor 111 from the pin 130.

The driver circuit 100 of FIG. 2a comprises a dual-stage power converter. The controller 160 provides at least two output pins 151, 152 for providing respective pulse width modulated control signals to the two power switches 163, 173 (which may be implemented as transistors, e.g. as metal oxide semiconductor field effect transistors, MOSFETs) of the two converter stages. The driver circuit 100 of FIG. 2a makes use of a dual stage SEPIC/Flyback converter, wherein the first converter (a SEPIC converter) 191 comprises the components 162, 163, 164, 165, 166 and wherein the second converter (a flyback converter) 192 comprises the components 172, 173, 175, 176. In the illustrated example, the second converter stage provides for the SELV (Separated or safety extra-low voltage) requirements.

As indicated above, the controller 160 comprises the startup and input voltage sensing pin 130 which is configured to provide an initial charge to the supply voltage capacitor 111 upon startup of the driver circuit 100, thereby allowing the controller 160 to start operation. Furthermore, the startup and input voltage sensing pint 130 may be used to sense the input voltage provided by the mains supply 101. This may be used to sense events encoded in the input voltage (e.g. encoded in the mains supply), as will be described in the context of FIG. 3. The controller 160 may be configured to control an illumination state of the LED array 120 based on a detected event (e.g. as described in the context of FIG. 3).

As indicated above, the first converter stage of the driver circuit 100 comprises a SEPIC (Single-ended primary-inductor converter) comprising a SEPIC transformer 162. The transformer 162 comprises a primary winding 181 and a secondary winding 182 which form the SEPIC converter structure. Furthermore, the transformer 162 may comprise an auxiliary winding 183 which may be used for measurement purposes. In particular, the auxiliary winding 183 may be used to detect the zero crossing of the inductor current through the primary winding 181, when the power switch 163 of the SEPIC is in off-state. The zero crossing of the inductor current typically corresponds to the time instant when no more energy is stored in the primary winding 181, and is often referred to as free-wheeling. The detection of the zero crossing of the inductor current (i.e. the detection of free-wheeling) is beneficial, as it allows the power switch 163 to be switched to the on-state, at a time instant when the inductor current is substantially zero. As a result, the power losses of the SEPIC can be reduced and the lifetime of the power switch 163 can be increased.

In the present document, it is proposed to use the startup and input voltage sensing pin 130 also to enable the controller 160 to measure the zero crossing of the inductor current of the SEPIC. For this purpose, the auxiliary winding 183 of the SEPIC transformer 162 is coupled to the pin 130 via a diode 131 and a resistor 132, thereby overlaying the input voltage measurement signal (provided via the startup resistors 161) and the inductor current measurement signal (provided via the auxiliary winding 183 of the SEPIC transformer 162). The diode 131 may be used to decouple the auxiliary winding 183 from the startup resistors 161 at time instants when the power switch 163 is closed (and energy is stored in the transformer 162). The resistor 132 may be used to prevent current peaks. The controller 160 may be configured to separate the overlaid measurement signals received via pin 130. The separation of the overlaid measurement signals may be performed using digital signal processing techniques. Alternatively or in addition, the separation of the overlaid measurements signals may be performed using appropriate circuitry and/or temporal separation. By way of example, a first measurement signal may be measured during a first time period (e.g. when the power switch 163 is closed) and a second measurement signal may be measured during a subsequent second time period (e.g. when the power switch 163 is open).

FIG. 2b shows an excerpt diagram 200 of the driver circuit 100 of FIG. 2a. In particular, FIG. 2b illustrates how the measurement of the input voltage and the measurement of the inductor current (i.e. the measurement of free-wheeling) may be performed using a single pin 130 of the controller 160. The circuit diagram 200 of FIG. 2b shows a voltage divider comprising the resistors 201, 202. The voltage divider 201, 202 may be used to sense the input voltage (derived e.g. from the mains supply) of the driver circuit 100. Furthermore, the circuit diagram 200 shows the diode D2 131 and the resistor R4 132 which are coupled to the auxiliary winding 183 of the transformer 162.

The controller 160 may comprise a control switch S1 203 and a current source 204. The current source 204 may be switched in synchronization with, e.g. in accordance to, the power switch 163. If the power switch 163 is put into off-state (or high impedance state), the current source 204 may be switched on (e.g. by closing the control switch S1 203). On the other hand, if the power switch 163 is put into on-state, the current source 204 may be switched off (e.g. by opening the control switch S1 203). The free-wheeling detection or the measurement of the voltage subsequent to the diode D2 131 may be performed when the current source 204 is on. As such, the current source 204 provides a low impedance path with respect to the voltage divider 201, 202, and the auxiliary winding 183, the resistor R4 132 and the diode D2 131 are coupled with low impedance to the controller IC 160. The low impedance coupling of the auxiliary winding 183 to the controller 160 is beneficial, in order to rapidly discharge parasitic capacitors, when detecting free-wheeling (i.e. when detecting the zero crossing of the inductor current). The measurement signal for free-wheeling typically comprises high frequency components and should therefore be coupled to the controller 160 via a relatively low impedance.

In other words, the measurement of the input voltage via the voltage divider 201, 202 may be performed during a first time period, when the power switch 163 is in on-state and when the control switch S1 203 is open. The auxiliary winding 183 of the transformer 162 may be polarized such that the voltage drop at the auxiliary winding 183 is negative (with respect to ground), when there is a current ramping up in the primary winding 181 of the transformer 162. As a result, the diode D2 131 decouples the auxiliary winding 183 from pin 130 of the controller 160, thereby enabling the measurement of the input voltage via the voltage divider 201, 202 using the comparator 205 of the controller 160.

On the other hand, during a second time period, the power switch 163 may be in off-state and the control switch S1 203 may be closed. The current source 204 may be implemented with a low impedance compared to the low side resistor R2 202 of the voltage divider 201, 202, thereby forming a quasi short circuit of the low side resistor R2 202, i.e. thereby decoupling the measurement of the input voltage from the pin 130. On the other hand, the voltage drop across the auxiliary winding 183 can be measured using the comparator 205. In particular, a discontinuity of the voltage drop across the auxiliary winding 183 (occurring at the time instant of the zero-crossing of the inductor current) can be detected, thereby detecting free-wheeling at the controller 160 (i.e. at the comparator 205).

As indicated above, digital signal processing may be used to decode a complex measurement signal comprising a linear superposition of multiple time dependent measurement signals. As such, a plurality of measurement signals may be superimposed at an input pin 130 of the controller and the superimposed measurement signals may be separated using digital signal processing and/or using temporal de-multiplexing. As such, a set of independent sensors and a set of different sensing pins may be replaced by a reduced number of sensing pins. Due to the digital nature of the control algorithm, correction factors and error compensation may be applied.

As outlined in the context of FIGS. 2a and 2b, the driver circuit 100 may comprise a plurality of converter stages, e.g. a boost converter followed by a flyback converter. The free-wheeling detection of the SEPIC may be performed together with the voltage measurement of the input voltage (e.g. of the mains voltage) using a single sensing pin 130. The example SEPIC of FIGS. 2a and 2b comprises an optional diode 131 for avoiding negative voltages and/or for decoupling. Alternatively, by changing the polarity and by providing an internal offset, negative voltages can be detected. As such, the diode 131 may not be required.

For the flyback converter, the input voltage Vin of the flyback converter, including free-wheeling, may be measured together with the current through the flyback converter power switch 173 at the shunt resistor 141. If the power switch 173 is switched off, the input voltage Vin to the flyback converter can be measured at the pin 140 via the resistor divider formed by the resistors 143, 142. The shunt resistor 141 may have a relatively low resistance and may therefore not have a significant influence for the measurement of the input voltage. Free-wheeling may be detected, by detecting a fast change of the voltage sensed at the pin 140. In other words, when the power switch 173 of the flyback converter is in off-state, the measurement signal at the pin 140 is an indication of the bus voltage across the transformer 172, and the voltage divider 143, 142. As long as there is a current flowing through the transformer 172, there is a voltage drop across the primary winding of the transformer 172. However, upon zero crossing of the current, the voltage drops to zero, thereby causing a discontinuity of the voltage at the pin 140. This discontinuity can be detected within the controller 160, thereby detecting free-wheeling.

If the flyback converter power switch 173 is switched on, the voltage across the drain/source of the switch 173 is typically low (in the range of 10 to 100 mV). This cancels out the voltage drop across the voltage divider 143, 142 and by consequence the voltage at the shunt resistor 141 can be measured, thereby providing an indication of the current through the power switch 173. In other words, when the power switch 173 is in on-state, the voltage divider 143, 142 is short circuited by the power switch 173. As a result of this, the signal at pin 140 is indicative of the voltage drop at the shunt resistor 141, i.e. of the current through the power switch 173.

As such, FIGS. 2a and 2b have provided examples of power converters comprising a controller. The controller comprises at least one sensing pin which may be configured to measure a plurality of measurement signals. In particular, the at least one sensing pin may be configured to measure a first measurement signal, when the power switch of the power converter is in on-state, and to measure a different second measurement signal, when the power switch of the power converter is in off-state. As such, the number of sensing pins of the controller may be reduced, thereby reducing the cost of the power converter.

As indicated above, the measurement of the input voltage to the driver circuit 100 may be used to enable the driver circuit 100 to control the illumination state of the LED array 120, subject to one or more events detected at the controller 160 based on the input voltage to the driver circuit 100. As such, the driver circuit 100 of FIG. 2a may be configured to control the illumination state of the LED array 120 based on the input voltage sensed using the sensing pin 130.

FIG. 2c shows an excerpt of another example power converter using a single sensing pin for charging the supply voltage capacitor 111, for measuring the input voltage of the power converter and for measuring free-wheeling of the power converter. The sensing pin 130 is coupled to the startup resistors 161 (resistors R1 and R2). Furthermore, the sensing pin 130 is coupled to the auxiliary winding 183 of the transformer 162 of the boost converter. When the startup switch 222 is open, the supply voltage capacitor 111 may be charged via the diode 221 and the startup resistors 161. When closing the startup switch 222 (which is typically internal to the controller 160), the diode 221 decouples the supply voltage capacitor 111 from the sensing pin 130, thereby ensuring that the supply voltage capacitor 111 does not disturb the measurement signals provided by the startup resistors 161 and by the auxiliary winding 183. As such, the startup switch 222 may be closed for measuring the input voltage and/or for measuring free-wheeling.

The control switch 203 (referred to as S2 in FIG. 2c) may be opened to measure the input voltage (e.g. the mains voltage at 230V) using the voltage divider formed by the high side resistors 161 and the low side resistor R3 223. On the other hand, the control switch 203 may be closed to measure the free-wheeling of the boost converter. In the latter case, the current I1 provided by the current source 204 will typically be dominant (compared to the current (i.e. the measurement signal) provided by the voltage divider formed by the resistors 161 and the resistor R3 223). The voltage at the diode D7 131 and at the auxiliary winding 183 may be measured when the signal is positive. A negative signal may not be detectable by the circuit arrangement shown in FIG. 2c.

FIG. 2c shows an example, where the voltage divider for measuring the input voltage is implemented using an internal resistor R3 223. The internal resistor 223 is preferably calibrated to a particular value, as IC technologies typically do not provide absolutely accurate resistors. As such, the voltage divider used to measure the input voltage is implemented using the external resistors R1, R2 161 (forming the high side resistor) and the internal resistor R3 (forming the low side resistor). The control switch 203 is kept open, when measuring the input voltage (via the voltage divider 161, 223). On the other hand, the control switch 203 is closed, when measuring free-wheeling.

It should be noted that the internal resistor R3 223 may be decoupled using an additional switch (not shown), when the current source 204 is active (i.e. when the control switch 203 is closed). As such, the internal resistor 223 can be made infinitive, when measuring free-wheeling. Additionally, the resistor R3 223 can be provided with several values for adjusting a larger range for the resistors R1 201 and R2 202 and the charge current.

Figure 2D:
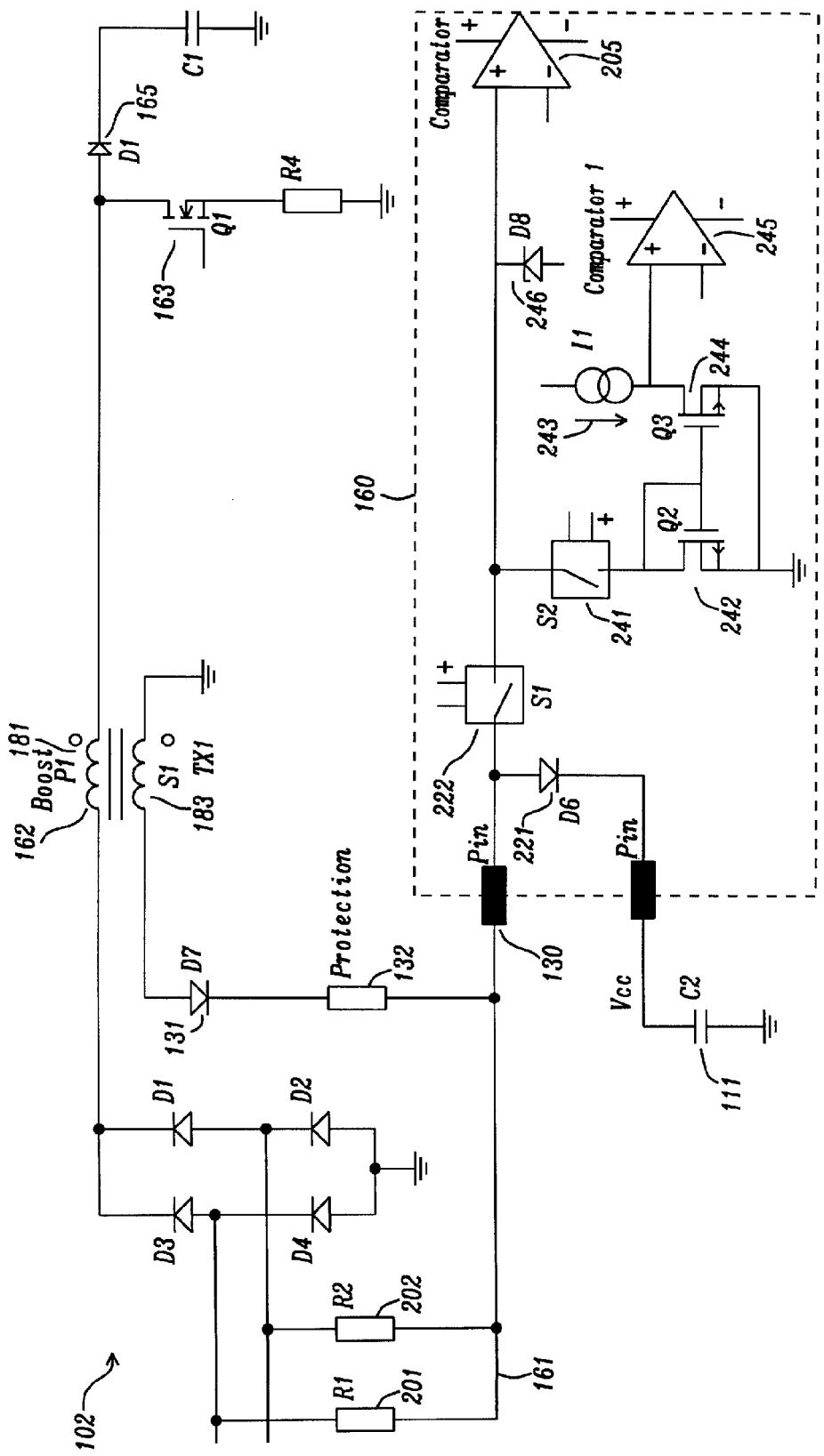
FIG. 2d shows an excerpt of a further example power converter using a single sensing pin for charging the supply voltage capacitor, for measuring the input voltage and for measuring free-wheeling (wherein the circuit for measuring free-wheeling is not shown)

A further option may be to replace the resistor R3 223 by a current mirror as illustrated in FIG. 2d. FIG. 2d shows an excerpt of a further example power converter using a single sensing pin 130 for charging the supply voltage capacitor, for measuring the input voltage and for measuring free-wheeling. In FIG. 2d the current source 204 and the control switch 203 are not shown, but may be provided for measuring free-wheeling at the comparator 205. A Zener diode 246 may be used to protect the input of the comparator 205.

In FIG. 2d, the resistor R3 223 is replaced by an additional current source 243 and a current mirror formed by the transistors 242 and 244. Furthermore, an additional switch 241 may be used to couple the current mirror and the current source to the sensing pin 130, when measuring the input voltage, and to decouple the current mirror and the current source from the sensing pin 130, when measuring free-wheeling. The use of a current mirror and current source is beneficial in order to clamp the voltage drop at the additional comparator 245 to a certain (relatively low) level. The measurement of the input voltage may be performed using the additional comparator 245 arranged at one side of the current mirror. The current mirror can be switched off using the switch 241. The mirror and/or the current source can be adjusted. It should be noted that instead of the current source 243, a resistor may be used and the voltage at the resistor can be measured. The current mirror may be implemented as a cascaded current mirror to improve the linearity of the current mirror. It should be noted that there are other possibilities for implementing the function of the current mirror (e.g. an active current mirror comprising an operational amplifier).

Figure 3:
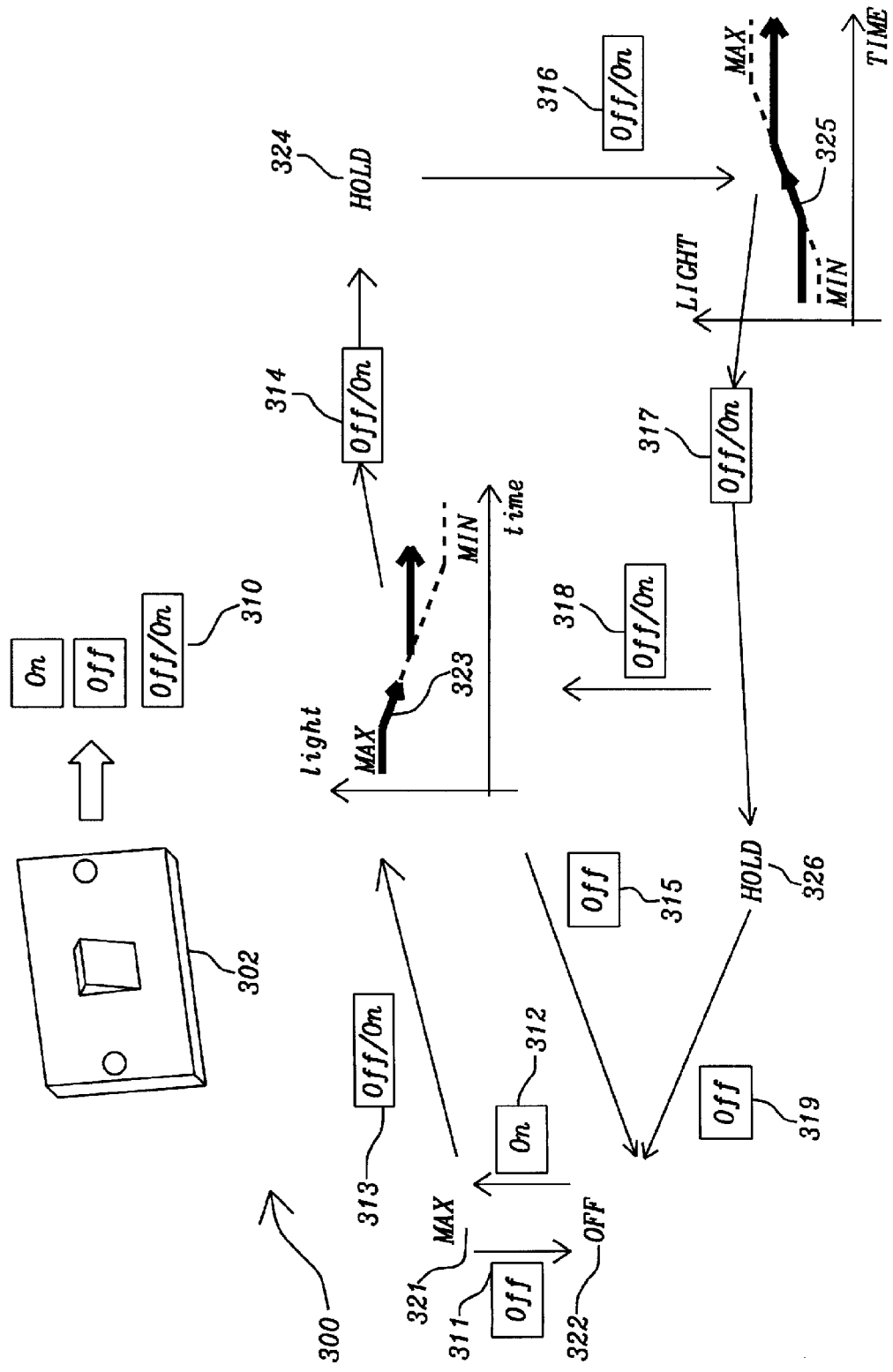
FIG. 3 illustrates an example method for controlling the illumination level of a light bulb assembly based on events detected from the mains voltage.

FIG. 3 illustrates an example method 300 which makes use of a mains switch 301 as signaling means, in order to encode a plurality of events 310. The example events of FIG. 3 are an "ON" event, corresponding to a switch 301 which is kept on for a minimum pre-determined time interval; an "OFF event, corresponding to a switch 301 which is kept off for a minimum pre-determined time interval; and an "OFF/ON" event, corresponding to an event where the switch 301 is briefly switched from ON to OFF and then back to ON within a predetermined time interval. These three events in combination with various illumination states can be used to provide a dimming function (even when no phase-cut dimmer is available at the mains supply). The three events may be detected by the controller 160 via the startup and input voltage sensing pin 130. By way of example, the controller 160 may be configured to determine whether the input voltage (e.g. the root means squared value of the input voltage) is greater than or smaller than a voltage threshold, thereby determining whether the mains switch 301 is switched on or off.

It can be seen from FIG. 3, how the ON event 312 can be used to change the driver circuit 100 from the state "OFF", i.e. no intensity, (reference numeral 322) to the state "MAX", i.e. maximum intensity, (reference numeral 321), and how the OFF event 311 can be used to perform the inverse change of states. When in the "MAX" state 321, the OFF/ON event 313 can be used to put the driver circuit 100 into a dim down state 323. The dim down state 323 triggers a smooth decrease in intensity down towards a minimum intensity (e.g. 20% intensity). Using another OFF/ON event 314, the dim down state 323 may be stopped, thereby putting the driver circuit 100 into a hold state 324 at the current intensity. When detecting another OFF/ON event 316, the driver circuit 100 is put into a dim up state 325, thereby smoothly increasing the intensity up to the maximum intensity. Another OFF/ON event 317 may again put the driver circuit 100 into a hold state 326 (which differs from the hold state 324 in that a subsequent OFF/ON event 318 will retrigger the dim down state 323, instead of the dim up state 325). Whenever detecting an OFF event 315, 519, the driver circuit 100 is put into the OFF state 322. In the example method 300 (and the corresponding example state machine of the controller 206), this OFF state 322 can only be left, when detecting an ON event 312.

As such, the driver circuit 100 of FIGS. 2a and 2b may be configured to measure the input voltage of the SEPIC (i.e. to measure the mains voltage) and to measure free-wheeling of the SEPIC transformer 162 using a single sensing pin 130.

The measured input voltage may be used to control the illumination state of the LED array 120 (using e.g. the method 300) and the detected time instant of free-wheeling may be used to control the switching time instant of the SEPIC power converter 163. As a result of using only a single sensing pin 130, the cost of the driver circuit 100 (and the cost of the light bulb assembly 1 comprising the driver circuit 100) can be reduced.

Figure 4:
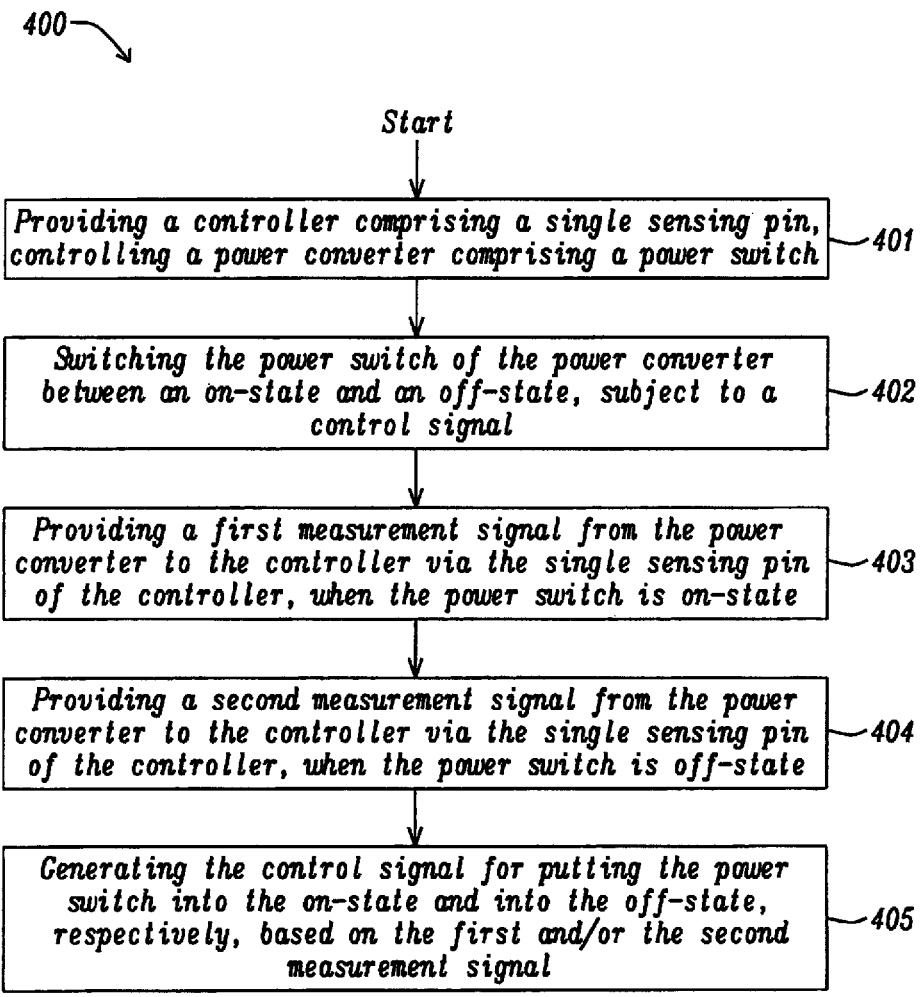
FIG. 4 shows a flow chart of an example method for providing a plurality of measurement signals using a single sensing pin.

FIG. 4 illustrates the flow chart of an example method 400 for converting electrical energy at an input voltage into electrical energy at an output voltage using a power converter 191, 192. Step 401 of the disclosed method depicts providing a controller comprising a single sensing pin, controlling a power converter comprising a power switch. Step 402 describes switching a power switch 163, 173 of the power converter 191, 192 between an on-state and an off-state, subject to a control signal. Furthermore, step 403 teaches providing a first measurement signal from the power converter 191, 192 to the controller 160 via a sensing pin 130, 140 of the controller 160, when the power switch 163, 173 is in on-state. The first measurement signal may be indicative of a voltage or a current at a particular node within the power converter. Examples of the first measurement signal are e.g. the input voltage of the power converter and/or a current through the power switch. Step 404 further describes providing a second measurement signal from the power converter 191, 192 to the controller 160 via the same sensing pin 130, 140 of the controller 160, when the power switch 163, 173 is in off-state. The second measurement signal may be indicative of a voltage or a current at a particular node within the power converter. Examples of the second measurement signal are the input voltage of the power converter and/or the voltage drop at a transformer or a winding/coil of the power converter. Step 405 illustrates generating the control signal for putting the power switch 163, 173 into the on-state and into the off-state, respectively, based on the first and/or the second measurement signal. In particular, the current through the power switch may be used as a trigger to switch off the power switch (e.g. when reaching a pre-determined peak current). Alternatively or in addition, the voltage drop at the transformer may be used as a trigger to switch on the power switch (e.g. when detecting free-wheeling of the transformer).

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A power converter configured to convert electrical energy at an input voltage into electrical energy at an output voltage, the power converter comprising
   a power switch configured to be switched between an on-state and an off-state;
   a voltage divider coupled to the input voltage for providing a first measurement signal;
   a transformer comprising a primary winding and an auxiliary winding for providing a second measurement signal; wherein the primary winding is arranged in series to the power switch; and
   a controller configured to generate a control signal for putting the power switch into the on-state and into the off-state, respectively; wherein the control signal is generated based on the first and the second measurement signal from the power converter external to the controller; wherein the controller comprises a sensing pin configured to sense the first measurement signal when the power switch is in the on-state, and configured to sense the second measurement signal when the power switch is in the off-state, wherein
   the auxiliary winding is coupled to the sensing pin, thereby providing the second measurement signal;
   the auxiliary winding is coupled to the sensing pin via a diode; and
   the diode is reverse biased, when the power switch is in on-state, thereby decoupling the auxiliary winding from the sensing pin, when the power switch is in on-state.

2. The power converter of claim 1, wherein the voltage divider comprises a high side resistor; and wherein the high side resistor is coupled to the sensing pin, thereby providing the first measurement signal.

3. The power converter of claim 1, wherein
   the controller comprises a current source which is coupled to the sensing pin via a control switch and which is coupled to ground; and
   the control switch is opened, when the power switch is put to the on-state, and is closed when the power switch is put to the off-state.

4. The power converter of claim 1, wherein the controller comprises a comparator configured to measure a voltage at the sensing pin.

5. The power converter of claim 1, wherein the controller is configured to
   operate the power converter according to a current operation state;
   detect one of a plurality of pre-determined events based on the first and/or the second measurement signal;
   determine a target operation state in accordance with a pre-determined state machine, based on the current operation state and based on the detected one of the plurality of pre-determined events; and
   operate the power converter in accordance with the target operation state.

6. The power converter of claim 2, wherein
   the power converter comprises a supply voltage capacitor coupled to a supply voltage pin of the controller; and
   the controller is configured to couple the sensing pin to the supply voltage pin upon startup of the power converter to charge the supply voltage capacitor via the high side resistor of the voltage divider.

7. The power converter of claim 4, wherein the controller comprises a startup diode which is configured to let pass a current from the sensing pin to the supply voltage pin, and which is configured to block a current from the supply voltage pin to the sensing pin.

8. The power converter of claim 5, wherein the controller comprises a startup switch configured to decouple a measurement circuitry for measuring the first and second measurement signals, when the startup switch is open.

9. The power converter of claim 2, wherein
   the voltage divider comprises a low side resistor coupled to ground; and
   a midpoint of the voltage divider between the high side resistor and the low side resistor is coupled to the sensing pin, thereby providing the first measurement signal.

10. The power converter of claim 2, wherein
the voltage divider comprises a current mirror arranged in series with a second current source;
the current mirror and the second current source are internal to the controller;
a first side of the current mirror is coupled to the sensing pin and a second side of the current mirror is coupled to the second current source; and
the controller comprises a second comparator configured to measure the first measurement signal at the second side of the current mirror.

11. A light bulb assembly comprising
an electrical connection module configured to electrically connect to a mains power supply, thereby providing electrical energy at the input voltage;
a power converter, configured to provide electrical energy at an output voltage from the electrical energy at the input voltage, the power converter comprising:
a power switch configured to be switched between an on-state and an off-state;
a voltage divider coupled to the input voltage for providing a first measurement signal;
a transformer comprising a primary winding and an auxiliary winding for providing a second measurement signal; wherein the primary winding is arranged in series to the power switch; and
a controller configured to generate a control signal for putting the power switch into the on-state and into the off-state, respectively; wherein the control signal is generated based on the first and the second measurement signal from the power converter external to the controller; wherein the controller comprises a sensing pin configured to sense the first measurement signal, when the power switch is in the on-state, and configured to sense the second measurement signal, when the power switch is in the off-state, wherein
the auxiliary winding is coupled to the sensing pin, thereby providing the second measurement signal;
the auxiliary winding is coupled to the sensing pin via a diode; and
the diode is reverse biased, when the power switch is in on-state, thereby decoupling the auxiliary winding from the sensing pin, when the power switch is in on-state; and
a light source configured to provide light using the electrical energy at the output voltage.

12. The light bulb assembly of claim 11, wherein the light source comprise a solid state lighting device.

13. A method for converting electrical energy at an input voltage into electrical energy at an output voltage, the method comprising
providing a controller comprising a sensing pin, controlling a power converter comprising a power switch;
switching a power switch of a power converter between an on-state and an off-state, subject to a control signal;
providing a first measurement signal from the power converter to a controller via the sensing pin of the controller, when the power switch is in the on-state; wherein the first measurement signal is derived from a voltage divider coupled to the input voltage;
providing a second measurement signal from the power converter to the controller via the sensing pin of the controller, when the power switch is in the off-state; wherein the second measurement signal is derived from a transformer comprising a primary winding arranged in series with the power switch; and
generating the control signal for putting the power switch into the on-state and into the off-state, respectively, based on the first and/or the second measurement signal, wherein
the transformer comprises an auxiliary winding which is used for measurement purposes; and
it is ensured that the provision of the first measurement signal is not disturbed by the second measurement signal by coupling the sensing pin via a diode to the auxiliary winding, wherein the diode is reverse biased in order to decouple the auxiliary winding from the sensing pin, when the power switch is in the on-state.

14. The method of claim 13 wherein the power converter is used in a driver circuit for a light bulb assembly, wherein operation states of the power converter correspond to different illumination states of the light bulb assembly.

15. The method of claim 13 wherein the control signal is a pulse-width modulated signal.

16. The method of claim 13 wherein the first measurement signal is indicative of an input voltage of the power converter and/or a current through the power switch.

17. The method of claim 13 wherein the second measurement signal is indicative of an input voltage of the power converter and/or a voltage drop at a transformer or at a winding/coil of the power converter.

18. The method of claim 13 wherein the controller is provided with a plurality of different measurement signals using only the sensing pin.

19. The method of claim 18 wherein the sensing pin is configured to sense the first measurement signal, when the power switch is in the on-state, and configured to sense the second measurement signal, when the power switch is in the off-state.

20. The method of claim 18 wherein information regarding the input voltage comprises information used for controlling the operational state of the power converter.

21. The method of claim 18 wherein the sensing pin of the controller is used to provide the controller with information regarding an input voltage and with information regarding a zero crossing of an inductor current through a primary winding of the transformer, when the power switch is in off-state wherein the zero crossing of the inductor current corresponds to a time instant when no more energy is stored in the primary winding of the transformer and is referred to as free-wheeling of the transformer.

22. The method of claim 21 wherein the information regarding the free-wheeling of the transformer of the power converter comprises information used for determining the time instant for putting the power switch to on-state.

23. The method of claim 22 wherein the auxiliary winding is used to detect the free-wheeling state of the transformer.

24. The method of claim 13 wherein the method steps are performed by a software program, which is adapted for execution on a processor.

* * * * *